United States Patent
Adunuthula et al.

(10) Patent No.: US 6,845,505 B1
(45) Date of Patent: *Jan. 18, 2005

(54) WEB REQUEST BROKER CONTROLLING MULTIPLE PROCESSES

(75) Inventors: Seshu Adunuthula, Fremont, CA (US); Mala Anand, Palo Alto, CA (US); Tsung-Jen Chou, Menlo Park, CA (US); Shehzaad Nakhoda, Palo Alto, CA (US); Raymond Ng, Foster City, CA (US); Robert Pang, Mountain, CA (US); Ankur Sharma, Belmont, CA (US); Matthew Bookman, Los Gatos, CA (US)

(73) Assignee: Oracle International Corporation, Redwood Shores, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/794,269

(22) Filed: Feb. 3, 1997

(51) Int. Cl.[7] .................................................. G06F 9/00
(52) U.S. Cl. ....................................... 718/105; 718/104
(58) Field of Search ................................ 395/674, 675, 395/682, 684, 200.56, 200.33; 707/10; 709/104, 105, 302, 304, 226, 203, 102, 201, 206, 219, 225, 229, 238, 239; 718/104, 105, 102

(56) References Cited

U.S. PATENT DOCUMENTS

| | | | | |
|---|---|---|---|---|
| 4,918,595 A | * | 4/1990 | Kahn et al. ................. | 364/200 |
| 5,210,824 A | * | 5/1993 | Putz et al. ................... | 395/145 |
| 5,212,793 A | * | 5/1993 | Donica et al. .............. | 395/700 |
| 5,249,290 A | * | 9/1993 | Heizer ........................ | 395/650 |

(List continued on next page.)

FOREIGN PATENT DOCUMENTS

| | | |
|---|---|---|
| EP | 553560 A2 * | 8/1993 |
| EP | 00733969 | 9/1996 |
| EP | 0812088 A2 | 10/1997 |
| WO | WO97/40457 | 10/1997 |

OTHER PUBLICATIONS

J. Gray, et al, "Scal Up with TP Monitors", Byte magazine, Apr. 1995, pp. (1–10).*

Merle P et al: "CorbaWeb: A generic object navigator". Computer Networks and ISDN Systems, vol. 28, No. 11, May 1996, p. 1269–1281 XP004018226.

Modeling transaction integrity: how CASE tools illustrate the relationships between transactions and data; Frank, Maurice, DBMS, v6, n1, p62(5), Jan. 1993.

(List continued on next page.)

Primary Examiner—Sue Lao
(74) Attorney, Agent, or Firm—Christopher J. Brokaw; Hickman Palermo Truong & Becker LLP

(57) ABSTRACT

A web server configured to respond to client requests over a network such as the World Wide Web includes a web listener having a Hypertext Transfer Protocol (HTTP) daemon, a plurality of extension programs configured to perform respective operations, and a web request broker configured to identify one of the programs for responding to a client request, and determine the availability of an instance of the identified program. The web request broker maintains control of multiple instances of each server extension program to provide enhanced server operation without overwhelming server resources. The web request broker maintains a minimum number of instances of the identified program in memory, each executed in its own address space. The web request broker determines whether an available instance of the identified program is available from an existing number of instances, and selectively initiates a new instance of the program if no other instance is available. If no instance is available and the existing number of instances exceeds the maximum prescribed number, then the web request broker returns the reply to the web listener to send a reply over the network that the request was not processed.

35 Claims, 6 Drawing Sheets

U.S. PATENT DOCUMENTS

| | | | | |
|---|---|---|---|---|
| 5,329,619 A | * | 7/1994 | Page et al. | 395/200 |
| 5,341,478 A | * | 8/1994 | Travis, Jr. et al. | 395/200 |
| 5,361,350 A | | 11/1994 | Conner et al. | 395/600 |
| 5,457,797 A | | 10/1995 | Butterworth et al. | 395/682 |
| 5,504,897 A | | 4/1996 | Gans et al. | 395/650 |
| 5,546,584 A | | 8/1996 | Lundin et al. | 395/700 |
| 5,557,798 A | * | 9/1996 | Skeen et al. | 395/650 |
| 5,592,654 A | * | 1/1997 | Djakovic | 395/500 |
| 5,613,148 A | | 3/1997 | Bezviner et al. | 395/800 |
| 5,623,656 A | | 4/1997 | Lyons | 707/10 |
| 5,706,442 A | | 1/1998 | Anderson et al. | 395/227 |
| 5,708,780 A | | 1/1998 | Levergood et al. | 395/200.12 |
| 5,715,314 A | | 2/1998 | Payne et al. | 380/24 |
| 5,724,424 A | | 3/1998 | Gifford | 380/24 |
| 5,737,592 A | | 4/1998 | Nguyen et al. | 395/604 |
| 5,737,607 A | | 4/1998 | Hamilton et al. | 395/701 |
| 5,745,681 A | | 4/1998 | Levine et al. | 709/200 |
| 5,752,246 A | * | 5/1998 | Rogers et al. | 707/10 |
| 5,761,507 A | * | 6/1998 | Govett | 395/684 |
| 5,761,662 A | | 6/1998 | Dasan | 707/10 |
| 5,761,673 A | * | 6/1998 | Bookman et al. | 707/104 |
| 5,761,684 A | | 6/1998 | Gibson | 707/515 |
| 5,774,670 A | | 6/1998 | Montulli | 395/200.57 |
| 5,778,224 A | * | 7/1998 | Tobe et al. | 395/670 |
| 5,796,393 A | | 8/1998 | MacNaughton et al. | 345/329 |
| 5,802,291 A | * | 9/1998 | Balick et al. | 395/200.32 |
| 5,805,804 A | * | 9/1998 | Laursen et al. | 395/200.02 |
| 5,822,585 A | | 10/1998 | Noble et al. | 395/680 |
| 5,826,239 A | | 10/1998 | Du et al. | 705/8 |
| 5,826,242 A | | 10/1998 | Montulli | 705/27 |
| 5,835,712 A | | 11/1998 | DuFresne | 709/203 |
| 5,848,246 A | | 12/1998 | Gish | 395/200.58 |
| 5,857,102 A | * | 1/1999 | McChesney et al. | 395/653 |
| 5,857,191 A | | 1/1999 | Blackwell et al. | 707/10 |
| 5,859,971 A | | 1/1999 | Bittinger et al. | 709/203 |
| 5,859,972 A | | 1/1999 | Subramaniam et al. | 395/200.33 |
| 5,860,072 A | | 1/1999 | Schofield | 707/101 |
| 5,862,318 A | | 1/1999 | Habben | 395/182.18 |
| 5,862,325 A | | 1/1999 | Reed et al. | |
| 5,864,866 A | | 1/1999 | Henckel et al. | 707/103 |
| 5,864,871 A | | 1/1999 | Kitain et al. | 707/104 |
| 5,872,969 A | | 2/1999 | Copeland et al. | 395/671 |
| 5,875,296 A | | 2/1999 | Shi et al. | 395/188.01 |
| 5,890,161 A | | 3/1999 | Helland et al. | 707/103 |
| 5,894,554 A | * | 4/1999 | Lowery et al. | 395/200.33 |
| 5,897,622 A | | 4/1999 | Blinn et al. | 705/26 |
| 5,909,492 A | | 6/1999 | Payne et al. | 380/24 |
| 5,961,601 A | | 10/1999 | Iyengar | 709/229 |
| 5,991,802 A | | 11/1999 | Allard et al. | 709/219 |
| 6,067,545 A | | 5/2000 | Wolff | |
| 6,070,191 A | * | 5/2000 | Narendran et al. | 709/26 |
| 6,073,241 A | | 6/2000 | Rosenberg et al. | |
| 6,098,093 A | * | 8/2000 | Bayeh et al. | 709/203 |
| 6,185,625 B1 | | 2/2001 | Tso et al. | |

OTHER PUBLICATIONS

Luotonen et al., "World–Wide Web proxies", pp. 147–154, computer Network and ISDN system, 01/94.

James Powell, "Creating a hypertext library information system," pp. 59–66, 02/94.

Progress Software, Webspeed 1.0 technical product brief 1998, Wysiwyg://90/http://www.progress–softwa . . . ernet/webspeed/white/tech/docs/arch.html.

Computer Reseller News "Progress Software offers tools to speed use of Web", Oct. 7, 1996 http://proquest.umi.com/pdqweb?TS=91798 . . . &Sid=1&Deli=1&RQT=309&Dtp=1.

Butler Group Technology Audits, "Butler Group WebSpeed Technology Audit" 1996 http://www.realtime.co.za/web-speed/whitep/wp03.html.

Netscape "Persistent Client State HTTP Cookies" 1997, http://home.netscape.com/newsref/std/cookie_spec.html.

M/Gateway Developments Ltd. "Persistence and State Awareness in WebLink" 1996 http://www.intersys.com/products/whitepapers/weblink_state.html.

Oracle Web Application Server™ Installation Guide for Sun SPARC Solaris 2.x , Release 3.0.

Oracle Corporation; Oracle WebServer Architecture; Seshu Adunuthula, Mala Anand, Ankur Sharma; http://www.win.tue.nl/00www/anand.html; dated Apr. 1996; retrieved May 10, 2000.

Distributed Objects on the Internet: Oracle Web Application Server™ 3.0; Richard Delval–Duarte; http://www.fors.com/eoug97/papers/0504.htm; dated Nov. 1996; retrieved May 10, 2000.

Oracle Web Application Server™ Overview, Release 3.0.

Oracle Web Application Server™ Cartridge User's Guide, Release 3.0.

Web Request Broker ™Programmer's Reference, Release 3.0.

Executive Overview; Oracle Web Application Server™ 3.0; http://www.silexsa.com/oracle/was30_eo.htm; retrieved May 11, 2000.

Oracle "Developing Your Own Web Application Server™ Cartridge" Release 3.0.1, published Aug. 14, 1998.

Oracle Web Application Server™, "Installation Guide for Sun SPARC Solaris 2.x" Release 3.0.1, published Aug. 14, 1998.

Oracle Corporation; WRB API Overview; published May 1996 http://www.cs.vu.nl/~eliens/WWW5/papers/Broker.html.

Web Application Server 3.0 "Oracle Web Application Server Documentation Roadmap".

KIVA Software Corporation, "Developing and Managing Web–based Enterprise Applications."

Gray, J., et al.: "Scale Up with TP Monitors," 4465 BYTE, vol. 20, No. 4, Apr. 1995.

Web Application Server 3.0.1 "Overview", published Aug. 14, 1998.

Oracle "Using Oracle Web Application Server™ Cartridge" Release 3.0.1, published Aug. 14, 1998.

Oracle "Performance Tuning", Operating System Parameters (Sun Solaris), published Aug. 14, 1998.

Oracle "Security", "Security Overview", published Aug. 14, 1998.

* cited by examiner

WEB REQUEST BROKER CONTROLLING MULTIPLE PROCESSES

FIELD OF THE INVENTION

This invention relates to server architectures in networked computer systems, more specifically to web servers executing server applications supporting dynamic operations for web users.

BACKGROUND OF THE INVENTION

The World Wide Web includes a network of servers on the Internet ("web servers"), each of which has one or more HTML (Hypertext Markup Language) pages. The HTML pages on a web server provide information and hypertext links to other documents on that and (usually) other web servers. Web servers communicate with clients by using the Hypertext Transfer Protocol (HTTP).

Users of the World Wide Web use a client program, referred to as a browser, to request, decode and display information from a selected web server. When the user of a browser selects a link, a request is sent over the Internet to the web server that stores information specified in the link. In response to the request, the web server transmits the specified information to the browser that issued the request. The browser receives the information, presents the received information to the user, and awaits the next user request.

Traditionally, the information stored on web servers is in the form of static HTML pages. Static HTML pages are created and stored at the web server prior to a request from a web browser. In response to a request, a static HTML page is merely read from storage and transmitted to the requesting browser. Currently, there is a trend to develop web server applications that respond to browser requests by performing dynamic operations. For example, a web server may respond to a request by issuing a query to a database, dynamically constructing a web page containing the results of the query, and transmitting the dynamically constructed HTML page to the requesting browser. To perform dynamic operations, the functionality of the web server must be enhanced or augmented. Various approaches have been developed for extending web servers to support dynamic operations.

One approach to the provide dynamic operations in response to requests from web browsers uses the common gateway interface (CGI). CGI is a specification for transferring information between a web server and a CGI program. A CGI program is any program designed to accept and return data that conforms to the CGI specification. The program could be written in any programming language, including C, Perl, or Visual Basic.

The CGI approach suffers from the disadvantage that a separate process (a separate instance of the CGI program) is initiated each time the specified request is received by the server. Receipt of a thousand such requests from different users will thus cause a thousand processes to be initiated, exhausting available resources on the server.

An alternative approach to providing dynamic responses to requests involves using a "plug-in" extensions. A plug-in extension intercepts messages sent to the server at various stages to perform application-specific processing for a specific user request. A web server plug-in executes in the same address space as the web server and all other web server plug-ins. Hence, an application developer designing a plug-in must be familiar with the lower level operational details of the web server. Moreover, execution of the plug-ins in the same address space as the web server exposes the web server to security and stability risks, where a faulty plug-in may cause other plug-ins or the web server itself to crash, or perform in an unpredictable manner.

SUMMARY OF THE INVENTION

There is a need for an arrangement that enables web servers to support dynamic server operations, where multiple external processes may be initiated, managed, and terminated in a controllable, scalable and efficient manner.

There is also a need for an arrangement for responding to a client request issued to a web server executing multiple instances of a program configured to process the request, where the request from the client is selectively dispatched to an available instance.

There is also a need for an arrangement that responds to a client request, where an instance of a program configured to process the request is selectively initiated based on the availability of existing instances and a predetermined maximum number of instances.

These and other needs are attained by the present invention, where a web request broker controls processing of a request by identifying a program that corresponds to the request, selectively initiating an instance of the program, and dispatching the request to the instance to process the request.

According to one aspect of the present invention, a request issued to a server from a client over a network system is processed by obtaining the request over a network, and identifying a program that corresponds to the request. An instance of the program is selectively initiated based on a prescribed number of instances of the program. The request is dispatched to the initiated instance of the program, and the instance executes the corresponding program to process the request. The request is then responded to, based on the execution of the instance. Hence, a plurality of programs, for example server extensions, may be added to a server process in a controllable manner. Moreover, the selective initiation of an instance of an identified program ensures that the server maintains control of the multiple instances, preserving stability in server operations. The prescribed number of instances may also specify both a minimum and a maximum number of instances, enabling processing delays to be minimized by maintaining at least a minimum number of instances in memory for subsequent requests, while maintaining control of server resources by limiting the maximum number of instances.

According to another aspect of the present invention, a method for execution by a server is configured to respond to a request for performance of an operation. The method includes obtaining the request over a network, and forwarding the request to a dispatcher plug-in executed by the server. The request is processed by causing the dispatcher plug-in to determine whether an available instance of a program, configured to handle the request, is available from an existing number of the program instances. If an instance is available, then the request is dispatched for execution by the available instance. If no instance is available, then a new instance is initiated if the existing number of instances does not exceed a maximum prescribed number. If no instance is available and the existing number of instances exceeds the maximum prescribed number, then a reply is sent over the network indicating the request was not processed. Hence, the dispatcher plug-in manages server resources in processing the request by selectively dispatching the request for execution or denying the request based upon the availability of an instance relative to the maximum prescribed number of instances.

Hence, the present invention enables a plurality of extension programs to be added to a server process in a controllable manner. The dispatcher plug-in controls execution of different extension programs running in separate and independent instances, and selectively routes requests to available instances, ensuring that the server process and the server extension programs are not overloaded.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The present invention is illustrated by way of example, and not by way of limitation, in the figures of the accompanying drawings in which like reference numerals refer to similar elements and in which.

DETAILED DESCRIPTION OF THE PREFERRED EMBODIMENT

A method and apparatus for responding to a request issued to a server from a client over a network system is described. In the following description, for the purposes of explanation, numerous specific details are set forth in order to provide a thorough understanding of the present invention. It will be apparent, however, to one skilled in the art that the present invention may be practiced without the specific details. In other instances, well-known structures and devices are shown in block diagram form in order to avoid unnecessarily obscuring the present invention.

Overview of Web Server Architecture

Figure 1:
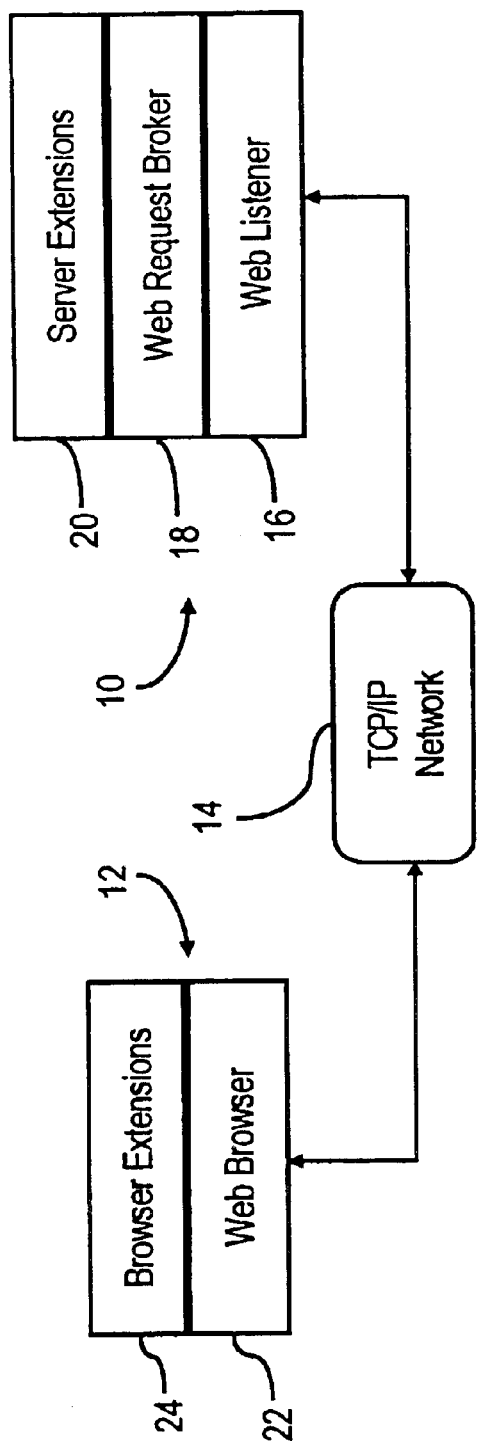
FIG. 1 is a block diagram of a web server responding to a request received from a client over a network system, according to an embodiment of the present invention.

FIG. 1 is a diagram of a web server responding to a request received from a client over a network system according to an embodiment of the present invention. The web server 10 receives the request from a client 12 over a network system 14, for example the World Wide Web using Transmission Control Protocol/Internet Protocol (TCP/IP). The web server 10 includes a web listener 16, a web request broker 18, and a plurality of server extension programs 20. A user of the network 14 uses the client program 12 to request, decode and display information from the web server 10. The client program 12 includes a web browser 22 that sends a request to the web listener 16 via the network 14. The client program also includes browser extension programs 24 (e.g., "plug-in" extensions) that provide additional processing capabilities for the web browser 22. Communication between the web browser 22 and the web listener 16 is executed using standardized protocol, for example Hypertext Transfer Protocol (HTTP), Version 1.0. The HTTP 1.0 protocol may be used with optional secure sockets layer (SSL) based data-encryption to establish a short-term connection between the web browser 22 and the web listener 16.

As described below, the web listener 16 receives the client request over the network 14, and forwards the request to the web request broker 18. The web request broker 18 selectively dispatches the request to an executable instance of one of the server extension programs 20 for processing. The web listener 16, upon receiving a reply from the web request broker 18, outputs the reply to the client request via the network 14. Upon receiving the reply, the web browser 22 determines the type of request received, and determines how to handle the response. For example, the response may either be processed natively by the web browser 22, or the web browser 22 may use one of the browser extension programs 24 for further processing. The browser extension programs 24 will typically be implemented as a client-side plug-in that performs specific processing of the reply. Upon completing the processing, the client 12 will typically display the result in the web browser's main viewing area as a hypertext mark-up language (HTML) page.

Web Request Broker

According to the present invention, web request broker 18, is configured to manage processing of client requests by selectively routing the client request to server extensions running in separate processes.

Figure 2:
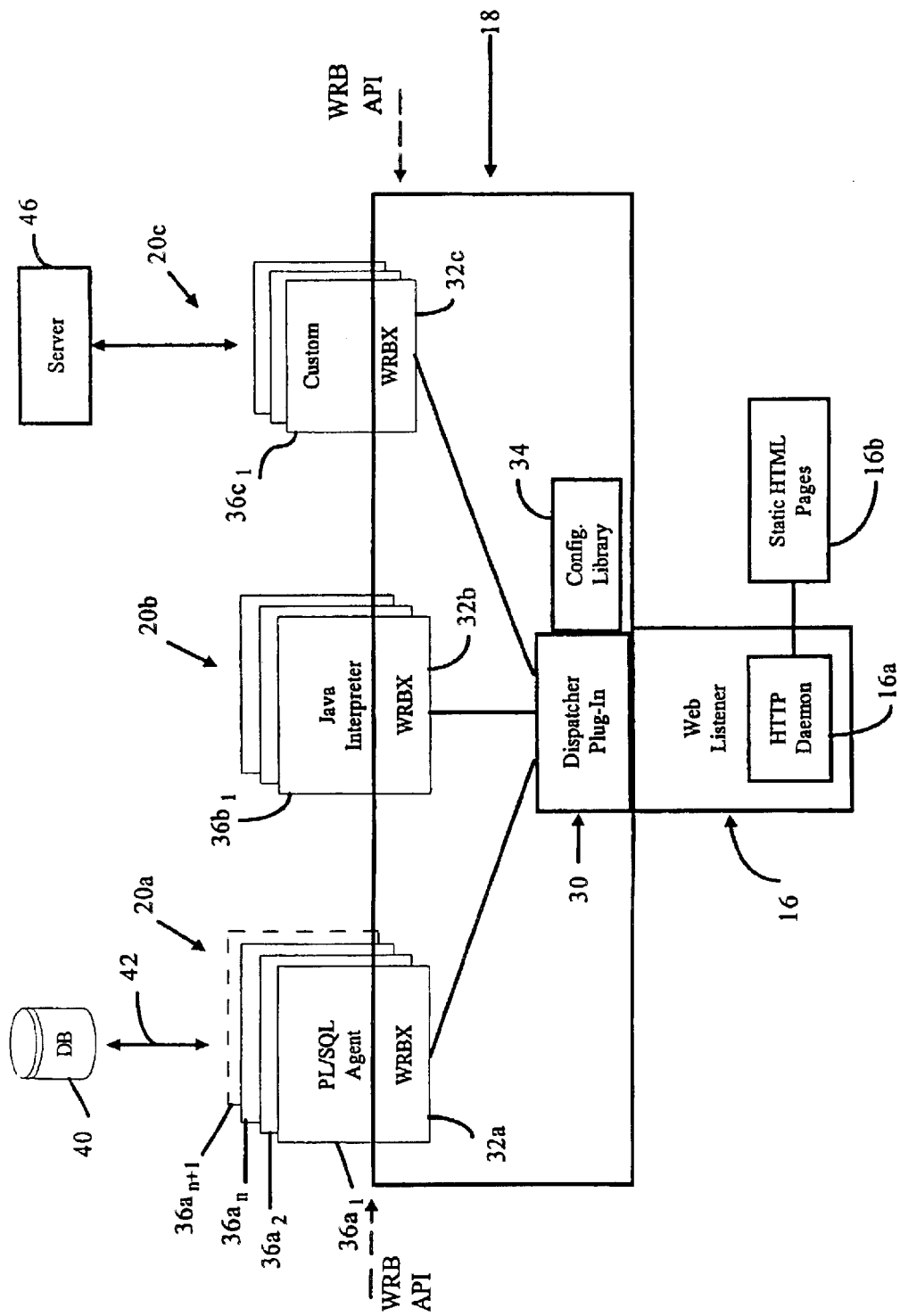
FIG. 2 is a block diagram of the web server according to a first embodiment of the present invention.

FIG. 2 is a block diagram of the server 10 according to a first embodiment of the present invention. The web listener 16 includes an HTTP daemon 16a that supports network transport according to HTTP protocol. The web listener 16 receives the client request from the network 14, typically delivered in the form of a Uniform Resource Locator (URL). The client request serves as an identifier for a web object, for example an HTML page or an operation to be performed. The web listener 16 hands off the client request to the web request broker 18 without any attempt at interpreting the client request.

The web request broker 18 includes a dispatcher plug-in 30 and a plurality of execution engines 32. The web request broker 18 controls processing of the client request by identifying an extension program 20 configured to process the client request, and dispatching the client request for execution by an available instance of the extension program. The dispatcher plug-in 30 includes a configuration library 34 that identifies the available programs for handling different requests, described in detail below. Once the dispatcher plug-in 30 identifies a program extension 20 that is configured to process the request, the dispatcher plug-in 30 determines whether an available instance of the program configured to handle the request is available, and dispatches the request for execution by the available instance, described below.

The web server 10 also includes a plurality of server extension programs 20a, 20b and 20c. Each server extension program, also referred to as a system cartridge, is configured for a different operation. Specifically, a server extension program is configured as a cartridge that performs a well-defined function, or as a programmable cartridge that acts as an interpreter or a routine environment for an application. An example of a programmable cartridge is a PL/SQL agent 20a, configured to process database queries according to the Oracle-based Programming Language using Structured Query Language (PL/SQL). The PL/SQL agent 20a executes a client request having a database query by executing an individual process 36 (i.e., a separate instance of the PL/SQL agent 20a). Execution of the instance 36a causes the instance to process the request, for example accessing a database server 40 in communication with the instance 36 via a data link 42.

Another example of a programmable cartridge-type server extension program is a JAVA interpreter 20b, which enable web application developers to write server-side JAVA applications to process client requests. Similarly, a custom server 20c may be configured as an extension program in order to provide dynamic operations, for example accessing processes executed by a third party server 46.

The extension programs 20a, 20b, and 20c, stored as executable code, are executed by first initiating an instance 36 of the corresponding extension program 20 into server memory, and executing the instance. An instance is equivalent to a process in a UNIX environment. The web request broker 18 manages the execution of each of the extension programs 20 by initiating a predetermined minimum number of instances 36a, 36b, 36c for the extension programs 20a, 20b, 20c, respectively. If the web request broker 18 receives a client request and determines that no instance 36 of the appropriate extension program is available, the web request broker 18 will initiate a new instance of the program to execute the request if the existing number of instances does not exceed a maximum prescribed number.

For example, if a client request specifies a request for access of the database 40, the web request broker 18 will identify the PL/SQL agent 20a as the program configured to handle the request. The web request broker 18 will determine whether an existing instance 36a of the program 20a is available to handle the request. If no instance is available, e.g., all the existing instances $36a_1$–$36a_n$ are processing other client requests, the web request broker 18 will initiate a new instance $36a_{n+1}$ if the existing number of instances 36a does not exceed a maximum prescribed number.

As shown in FIG. 2, the web request broker 18 includes web request broker execution engines (WRBX) 32 for each of the extension programs 20. The execution engine 32 controls execution of the instances of the corresponding program by providing an application programming interface (WRB API) that specifies predetermined operations to be performed by the instances of the corresponding program. By establishing basic callback functions between the execution engine 32 and an extension program, any extension program can be integrated into the server 10 by configuring the extension program to respond to the callback functions (for example an initialization function, a request handler, and a shutdown function), and then registering the extension program in the configuration library 34, described below.

Thus, if the dispatcher plug-in 30 determines that the PL/SQL agent 20a is the appropriate extension to process a request, the dispatcher plug-in 30 dispatches the request to the execution engine 32a. If a new instance of the program 20 needs to be initiated, the dispatcher plug-in 30 creates a new instance of the program in a separate address space and dispatches the request to the execution engine 32a of the new instance. The address space used to execute the instance of the program may be within memory of the computer system upon which the web request broker is executing, or on another computer system. The execution engine 32a then issues a request handler callback function to the specified instance $36a_i$, causing the instance $36a_i$ to process the request, for example by accessing the database 40. The instance $36a_i$ executing the request returns the result to the execution engine 32a, which forwards the result to the dispatcher plug-in 30. In the event that the web request broker 18 detects a fault in the operation, the execution engine 32a issues a shutdown function to abort the instance from memory.

Hence, the execution engine 32a provides an application programming interface to the web request broker 18 (WRB API) that specifies predetermined operations to be performed. Use of the WRB API enables programmers of the extension programs 20 to configure each extension program for high-level integration into the server 10 independent of the protocols used by the particular web listener with which the extension program will be used.

Figure 3A:
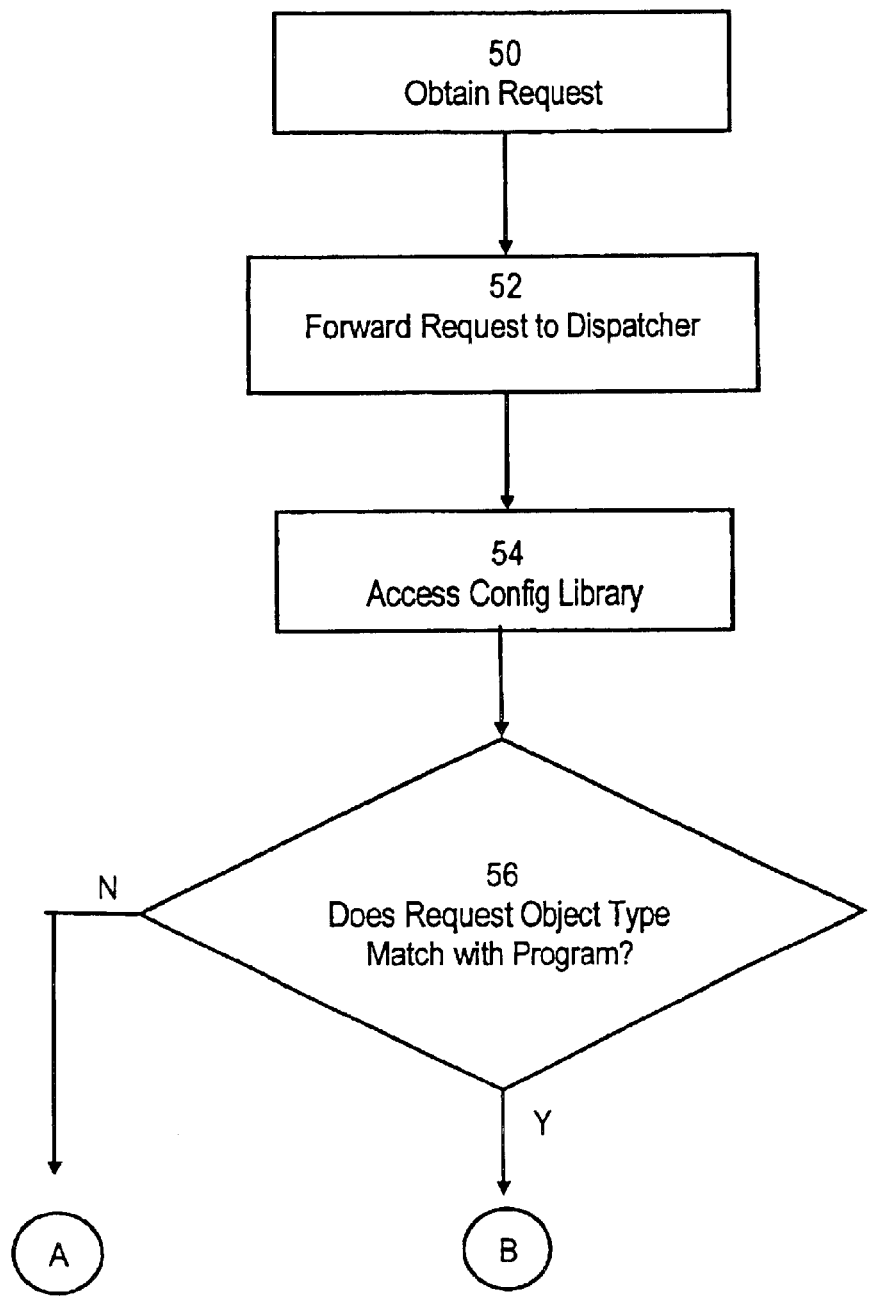
FIGS. 3A and 3B are flow diagrams summarizing the method for responding to the client request according to an embodiment of the present invention.
Figure 3B:
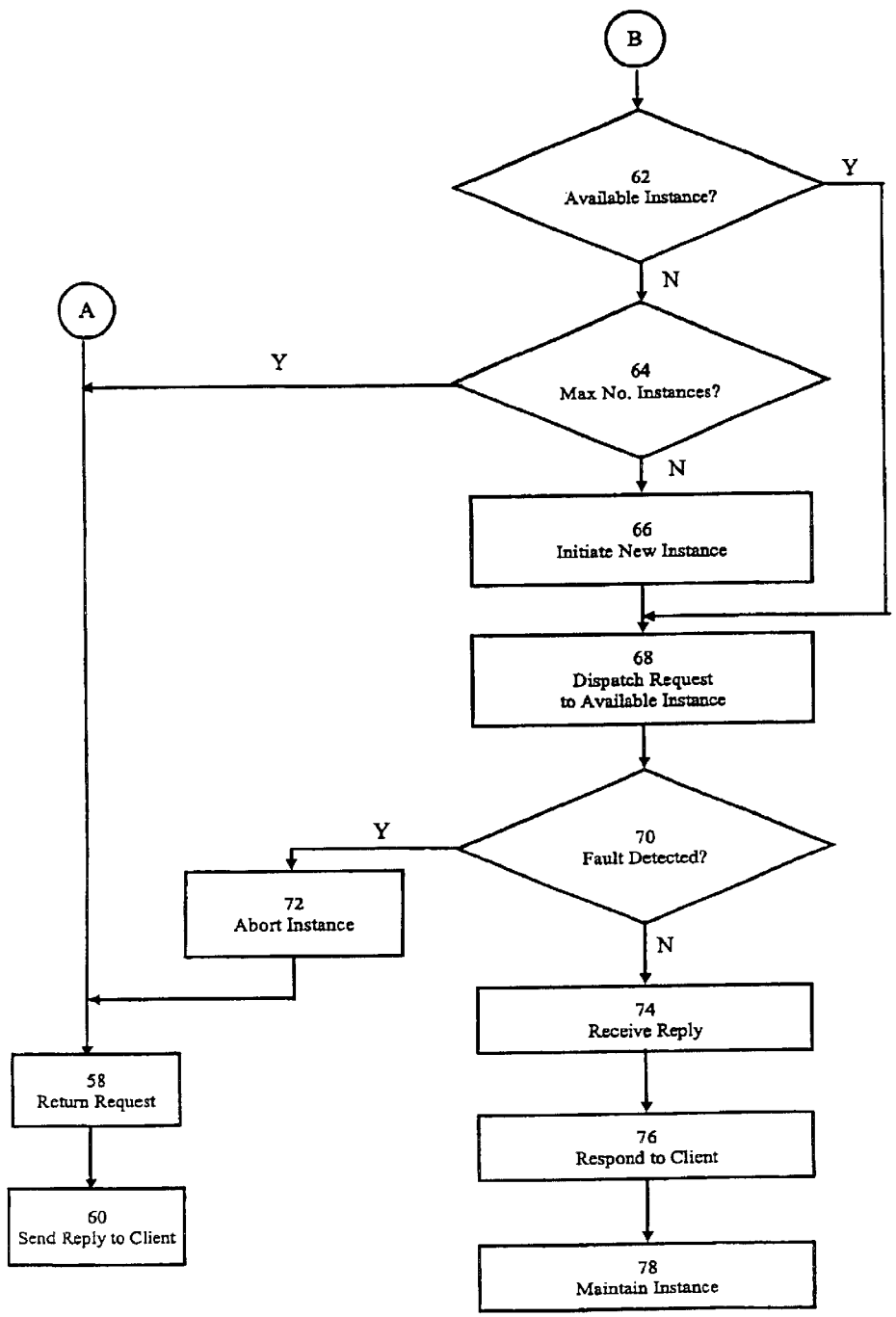

FIGS. 3A and 3B summarize a flow diagram illustrating a method of responding to the client request according to an embodiment of the present invention. The client request is received in step 50 by the web listener 16. Upon receiving the client request, the web listener 16 forwards the request to the web request broker 18 in step 52. The dispatcher plug-in 30 identifies the program that corresponds to the client request by accessing in step 54 the configuration library 34. The configuration library 34 includes for each program an object type corresponding to the request processed by the corresponding program. For example, if the client request is a URL request beginning with the virtual path "/java", the configuration library 34 will store a corresponding object specifying that the JAVA interpreter 36b is configured to handle requests having the virtual path "/java". The configuration library 34 will also include a virtual path specifying an address location for the stored program used to initiate instances of the program 20.

The dispatcher plug-in 30 determines in step 56 if the request object type (e.g., the virtual path specified in the client request) corresponds to an identifiable program, where the request object type corresponds to an object type stored in the configuration library 34. If the request object type does not correspond to an identifiable program, the request is returned to the web listener 16 in step 58 (see FIG. 3B). If in step 58 the HTTP daemon 16a recognizes the request as a request for a static HTML page, the HTTP daemon accesses the static HTML page from the page memory 16b, and sends the reply to the client in step 60. If the client request is not recognized by the HTTP daemon, the reply is sent to the client in step 60 indicating that the request was unrecognizable.

If in step 56 the dispatcher plug-in 30 identifies from the configuration library 34 an extension program configured to handle the request, the dispatcher plug-in 30 determines in step 62, shown in FIG. 3B, whether an available instance of the identified program is available among the existing number of instances 36. If in step 62 the dispatcher plug-in 30 identifies an available instance, for example instance $36a_2$ of the PL/SQL agent 20a, the corresponding execution engine 32 is called in step 68 to execute the available instance to process the request, described below. However, if in step 62 no instance of the identified program 20 is available, the dispatcher plug-in 30 determines in step 64 if the existing number of instances exceeds a maximum prescribed number, stored in the configuration library 34. If the existing number of instances exceeds the maximum prescribed number in step 64, the dispatcher plug-in 30 returns the request to the web listener 16 in step 58, after which the web listener sends a reply to the client over the network in step 60 indicating the request was not processed.

If in step 64 the existing number of instances does not exceed the maximum prescribed number, the dispatcher plug-in 30 initiates a new instance of the identified program and dispatches the request to the execution engine 32a of the new instance. For example, the dispatcher plug-in 30 initiates a new instance of the PL/SQL agent 20a. During this step, the stored sequences of instructions for the PL/SQL agent 20a are accessed to create a new instance 36a$_i$ of the program 20a in an address space that is separate from the address space in which dispatcher plug-in 30 is executing.

Once the new instance 36a, is running, the dispatcher plug-in 30 dispatches the request to the execution engine 32a associated with the new instance 36a$_i$ in step 68. The execution engine 32a sends a callback message to the new instance 36a$_i$ requesting execution of the request. The execution engine 20 passes in the callback message any parameters necessary for the instance 36a$_i$ to process the request, for example passwords, database search keys, or any other argument for a dynamic operation executed by the instance 36a$_i$. The instance 36a$_i$ then executes the request.

During the execution of the request by the instance in step 68, the dispatcher plug-in 30 monitors the instance to determine the occurrence of a fault in step 70. If in step 70 the dispatcher plug-in 30 detects a fault, the dispatcher plug-in 30 calls the corresponding execution engine 32 in step 72 to abort the instance 36 having the fault. The corresponding execution engine 32 in turn issues a shut down command across the API to the faulty instance. The instance, responding to the shut down command by the execution engine 32, will shut down without affecting any other process in any other address space.

If in step 70 no fault is detected, the dispatcher plug-in 30 receives a reply from the instance 36 upon completion of execution in step 74. The dispatcher plug-in 30 in step 76 forwards the reply to the web listener 16, which responds to the client with the reply from the executed instance 36. After executing the instance, the dispatcher plug-in 30 in step 78 maintains the instance in the memory, as shown in step 78 to enable execution of a subsequent request.

Hence, the disclosed arrangement manages multiple instances of different extension programs to process a variety of user requests. Each instance 36 for any program 20 is executed in a separate memory space, enabling a faulty instance 36 of a program 20 to be aborted without affecting any other instances of the programs. The web request broker 18 also controls the number of instances for each given extension program 20. Hence, server resources are controlled to ensure that a large number of requests do not overwhelm the server 10 by an uncontrollable generation of instances. Execution throughput also is improved by maintaining a minimum number of instances ready for execution. Moreover, additional instances may be initiated and maintained in memory for executing subsequent requests, as opposed to terminating an instance after a single execution and then reloading the extension program into memory in order to recreate an instance for execution of a subsequent request.

Figure 4:
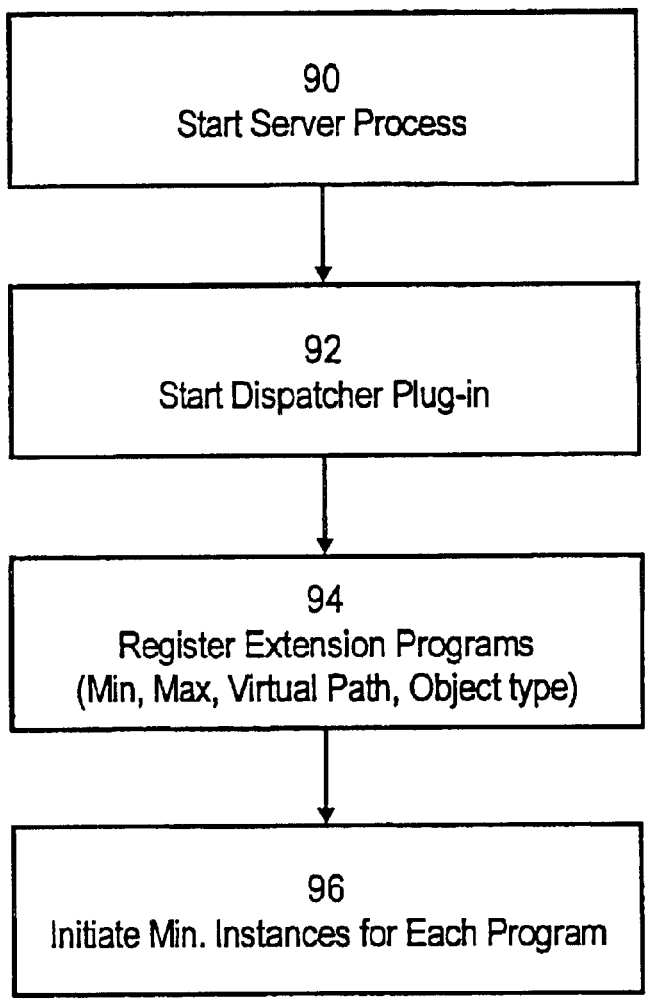
FIG. 4 is a flow diagram illustrating a method of initiating the server process according to an embodiment of the present invention.

FIG. 4 is a diagram illustrating the initialization of the server 10 according to an embodiment of the present invention. The server 10 is initialized by starting the server process in step 90, where the web listener and supporting processes are loaded into memory space. The server 10 then starts the dispatcher plug-in 30 in step 92, causing the sequences of instruction for executing the web request broker 18 to be stored in memory. The extension programs 20 are then registered with the dispatcher plug-in 30 in step 94 by storing in the configuration library 34, for each extension program 20: (1) the cartridge name; (2) the minimum number of required instances 36; (3) the maximum number of instances; (4) the virtual path for accessing the extension program, i.e., the address space to be accessed to initiate a new instance of the program; (5) the program-dependent function names used by the execution engine to execute the callback functions (initialization, request handler, shutdown); and (6) an object identifier, for example an object type to be supplied by a client request for requesting performance of an operation by the corresponding extension program 20. The object type may be a specific word, or may include a virtual path, for example "/java". The extension programs 20 may be registered in step 94 by a server manager, i.e., a web master having access to the configuration library in a real-time user-interactive environment. Once the server manager has established the configuration library, the extension programs may be registered in step 94 automatically by accessing a non-volatile memory, for example a disk.

After registering the extension programs with the dispatcher plug-in 30, the dispatcher plug-in 30 initiates the minimum instances for each program in a separate address space in step 96. Once the minimum number of instances has been initiated, the server 10 is prepared to process client requests. Each execution engine 32 tracks the location in memory and status of each instance 36 of the corresponding program 20.

Figure 5:
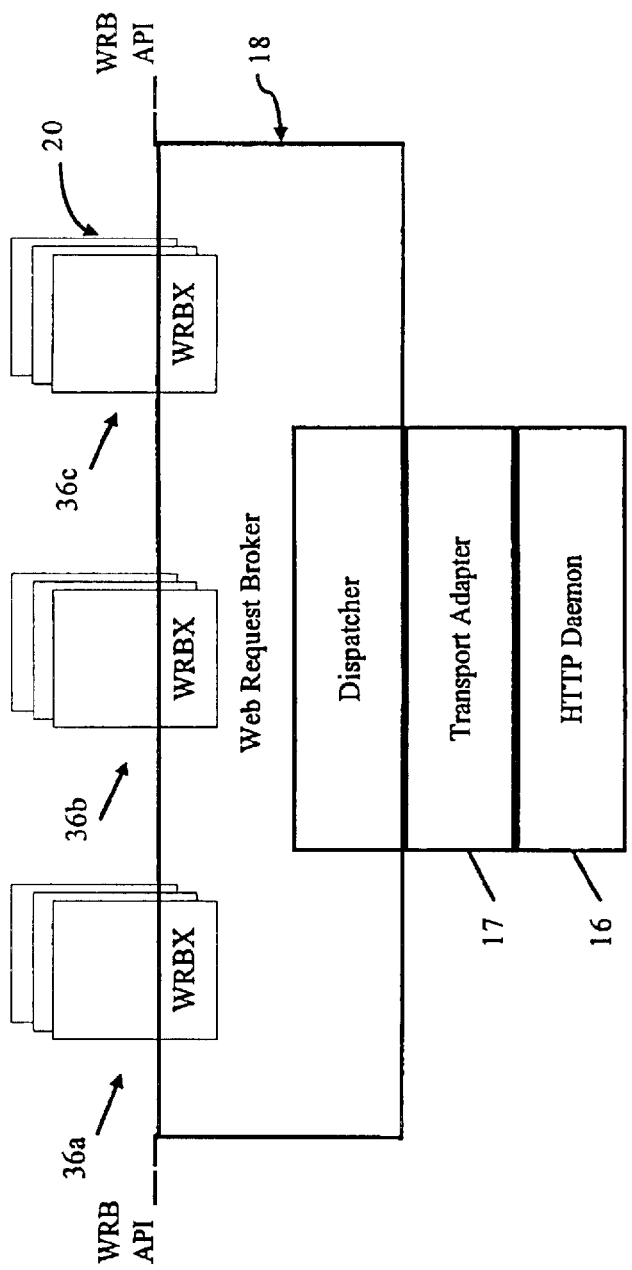
FIG. 5 is a block diagram illustrating the web request broker according to a second embodiment of the present invention.

FIG. 5 is a block diagram of the server 10, according to a second embodiment of the present invention. The first embodiment of FIG. 2 assumes that the dispatcher plug-in 30 is compatible with the lower level processes of the web listener 16 and the HTTP daemon 16a. The embodiment of FIG. 5 is a modification of the first embodiment of FIG. 2, in that the server includes a transport adapter 17 that receives a client request from the HTTP daemon 16' operating according to a protocol different from the web request broker 18.

The transport adapter 17 is configured to recognize the protocols of different HTTP daemons, and can convert the client requests received from the HTTP daemon 16' into a converted client request having a second protocol independent from the protocol of the HTTP daemon 16' and matching the protocol of the web request broker 18. Hence, the transport adapter 17 enables the web request broker 18 to be used with HTTP daemons from different vendors. Moreover, transport adapter 17 may be configured to accommodate different server architectures and operating systems. Hence, the transport adapter 17 converts a client request from the HTTP daemon 16' from a first protocol to a second protocol compatible with the web request broker 18. Similarly, replies from the web request broker are converted to the transport protocol of the HTTP daemon 16' to enable the HTTP daemon 16' to send the reply to the user via the network.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than restrictive sense.

What is claimed is:

1. A method for responding to a request issued to a server from a client over a network system, the method comprising the steps of:

said server obtaining the request over a network;

said server identifying, from a plurality of program types available to said server, a program type that corresponds to the request, wherein each program type of said plurality of program types implements different functionality than the other program types of said plurality of program types;

determining whether an instance of said program type currently exists that is not currently processing a previously received request;

if no currently executing instance of said program type exists that is not currently processing a previously received request, then said server selectively initiating an instance of the program type based on a comparison between how many instances of said program type are currently executing and a prescribed number of instances of said program type;

said server dispatching the request to said instance of said program type;

executing said instance to cause said instance to process said request; and responding to the request based on execution of said instance.

2. The method of claim 1, wherein:

the step of obtaining the request over a network is performed by a server process executing in a first address space; and the step of selectively initiating an instance of the program type includes initiating said instance in a second address space that is separate from the first address space.

3. The method of claim 1, further comprising the step of, after executing said instance, maintaining said instance in memory for executing a subsequent request.

4. The method of claim 1, further comprising the steps of:

detecting a fault in the instance during execution thereof; and aborting the instance in response to detecting said fault.

5. The method of claim 1, wherein the prescribed number of said instances specifies at least one of a maximum and a minimum number of instances, wherein each instance executes within an address space that is separate from the address spaces used by other instances of said program type.

6. The method of claim 5, wherein:

the step of selectively initiating an instance of the program type includes the step of initiating a specified minimum number of instances of said program type prior to obtaining the request over the network; and the method further includes the step of, after obtaining the request over the network, determining if one of the minimum number of instances is available for processing said request.

7. The method of claim 6 further including the step of, after obtaining the request over the network, initiating a new instance of the program type if none of the minimum number of instances is available for processing said request and the number of instances is less than the maximum number of instances.

8. The method of claim 6, wherein the step of executing said instance includes executing an available instance from the minimum number of instances.

9. The method of claim 1, wherein the step of selectively initiating an instance of the program type includes the step of returning the request to the network without processing said request when a current number of instances of said program type exceeding a maximum value associated with said program type.

10. The method of claim 1 further comprising the step of registering a plurality of program types with the server, wherein registration of each of said program types includes specifying a maximum number of instances for said program type, and a virtual path for said program type.

11. The method of claim 10, wherein:

the request identifies a virtual path; and the step of identifying a program type that corresponds to the request includes the step of identifying the program type based on the virtual path identified in the request.

12. The method of claim 1, wherein:

the step of obtaining the request over a network comprises receiving the request from a transport protocol process operating according to a first protocol; and the method includes the step of converting the request to a second protocol independent from the first protocol.

13. A method, for execution by a server, for responding to a request for performance of an operation, the method comprising:

obtaining the request over a network;

forwarding the request to a dispatcher executed by the server; and processing the request by causing the dispatcher to perform the steps of:

A) determining whether an available instance exists of a program type configured to handle the request, wherein the available instance is among an existing number of instances of the program type and is not currently processing a previously received request, B) if an available instance is available, then dispatching the request for execution by the available instance, C) if no instance is available, then initiating a new instance of the program type for execution of the request if the existing number of instances does not exceed a maximum prescribed number, D) if no instance is available and the existing number of instances exceeds the maximum prescribed number, then sending said reply over the network indicating the request was not processed, and E) registering with the dispatcher a plurality of program types configured to handle respective types of requests, the step of registering with the dispatcher a plurality of said program types including the step of storing in the dispatcher for each of said program types a maximum number of instances and a virtual path specifying an address location associated with the corresponding program type.

14. The method of claim 13, further comprising the step of:

receiving, by the dispatcher, a reply from the instance executing the request; and sending information contained in the reply over the network from the dispatcher to a client that issued the request.

15. The method of claim 13, further comprising the step of:

detecting by the dispatcher a fault in the instance executing the request; and terminating by the dispatcher the instance executing the request in response to the detected fault.

16. The method of claim 15, further comprising the step of sending a reply over the network indicating the request was not processed.

17. The method of claim 13, wherein each instance is executed within an address space that is separate from the address spaces used by other instances of said program type.

18. The method of claim 17, wherein the step of initiating a new instance of the program type comprises the step of initiating the new instance within an address space that is separate from the address spaces used by the other instances of said program type.

19. A method, for execution by a server, for responding to a request for performance of an operation, the method comprising:

obtaining the request over a network;

forwarding the request to a dispatcher executed by the server; and processing the request by causing the dispatcher to perform the steps of:

A) determining whether an available instance of a program type configured to handle the request is available among an existing number of instances of the program type, wherein the available instance is not currently processing a previously received request, B) if an available instance is available, then dispatching the request for execution by the available instance, C) if no instance is available, then initiating a new instance of the program type for execution of the request if the existing number of instances does not exceed a maximum prescribed number, D) if no instance is available and the existing number of instances exceeds the maximum prescribed number, then sending said reply over the network indicating the request was not processed, and E) delaying deallocation of said new instance at least a predetermined time interval after processing the request for processing a subsequent request, and automatically deallocating said new instance if no subsequent request has arrived after said predetermined time interval.

20. A method, for execution by a server, for responding to a request for performance of an operation by a particular program type, the method comprising:

obtaining the request over a network;

forwarding the request to a dispatcher executed by the server; and processing the request by causing the dispatcher to perform the steps of:

A) determining whether an available instance exists of a program type configured to handle the request, wherein the available instance is among an existing number of instances of the program type and is not currently processing a previously received request, B) if an available instance is available, then dispatching the request for execution by the available instance, C) if no instance is available, then initiating a new instance of the program type for execution of the request if the existing number of instances does not exceed a maximum prescribed number, D) if no instance is available and the existing number of instances exceeds the maximum prescribed number, then sending said reply over the network indicating the request was not processed, wherein the step of obtaining the request over the network comprises receiving the request from a transport protocol process operating according to a first protocol, said first protocol being one of a plurality of protocols; and the method further comprises the step of converting the request to a second protocol independent from the first protocol by a transport adapter configured to convert to said second protocol requests received according to any of said first plurality of protocols.

21. The method of claim 20, wherein the existing number of said instances is at least a prescribed minimum number of said instances.

22. The method of claim 20, further comprising the steps of:

causing the dispatcher to determine if a program type is configured to handle the request based on the operation specified in the request; and if no program type is configured to handle the request, then sending a reply over the network indicating the request was not processed.

23. The method of claim 20, wherein:

the step of obtaining the request over the network comprises the step of executing by the server a server process; and the step of processing the request by causing the dispatcher to perform said steps comprises the step of executing by the server a plug-in routine, added to the server process, to cause the dispatcher to perform said steps.

24. A computer readable medium having stored thereon sequences of instructions for responding to a request for performance of an operation received by a server, the sequences of instructions including instructions for performing the steps of:

obtaining the request over a network;

identifying a program type, from a plurality of program types, a program type that corresponds to the request, wherein each program type of said plurality of program types implements different functionality than the other program types of said plurality of program types;

determining whether an instance of said program type currently exists that is not currently processing a previously received request;

if no currently executing instance of said program type exists that is not currently processing a previously received request, then selectively initiating an instance of the program type based on a comparison between how many instances of said program type are currently executing and a prescribed number of instances of said program type;

dispatching the request to said instance of said program type;

executing said instance to cause said instance to process said request; and responding to the request based on execution of said instance.

25. The computer readable medium of claim 24, further comprising sequences of instructions for performing the steps of:

detecting a fault in the instance during execution thereof; and aborting the instance in response to detecting said fault.

26. The computer readable medium of claim 24, wherein the prescribed number of said instances specifies at least one of a maximum and a minimum number of instances, wherein each instance executes within an address space that is separate from the address spaces used by other instances of said program type.

27. A computer server configured to respond to a request for performance of an operation, comprising:

a network listener configured to receive the request over a network and send a response to the request over the network, the request having a prescribed object type specifying an operation to be performed;

a plurality of program types, each program type configured to perform an operation that generates an output in response to receiving a request having a corresponding object type specifying the operation performed by the program type, each program type having a prescribed number of instances executing at respective address spaces; and a dispatcher plug-in configured to identify one of the program types for responding to the request based on the prescribed object type, the dispatcher plug-in selectively dispatching the request to an available instance of the identified program type based upon the corresponding prescribed number of instances, wherein the available instance of the identified program type is selected to receive said request based on a set of factors that includes that said available instance is not currently processing a previously received request, the dispatcher plug-in sending said response to the network listener based on execution of the request by the available instance.

28. The server of claim 27, wherein the network listener receives and sends the request and the response based on Hypertext Transfer Protocol (HTTP).

29. The server of claim 28, wherein the network listener includes an HTTP daemon configured to output a static Hypertext Markup Language (HTML) page in response to the prescribed object type specifying sending said static HTML page.

30. The server of claim 27, further comprising a transport adapter configured to convert the request received by the network listener from a first protocol to a second protocol independent from the first protocol, the transport adapter converting the response output by the dispatcher plug-in from said second protocol to the first protocol before sending by the network listener.

31. The server of claim 27, further comprising a plurality of execution engines, each execution engine configured to control execution of the instances of the corresponding program types and provide an Application Programming Interface (API) specifying predetermined operations to be performed by the instances of the corresponding program type, the execution engine corresponding to the identified one program receiving the request from the dispatcher plug-in and controlling execution of the available instance processing the request.

32. The server of claim 31, wherein the predetermined operations specified by the API includes at least one of initialization, execution of the request, and shutdown by at least one of the instances of the corresponding program.

33. The server of claim 27, wherein each execution engine initiates a prescribed minimum number of said instances of the corresponding program type.

34. The server of claim 27, wherein the dispatcher plug-in includes a configuration library identifying for each of the program types the corresponding object type and the prescribed number of instances.

35. The server of claim 27, wherein the object type of the request includes a virtual path specifying the identified one program type.

* * * * *